(12) United States Patent
Swanson et al.

(10) Patent No.: US 9,977,682 B2
(45) Date of Patent: May 22, 2018

(54) SYSTEM MANAGEMENT MODE DISABLING AND VERIFICATION TECHNIQUES

(71) Applicant: Intel Corporation, Santa Clara, CA (US)

(72) Inventors: Robert Swanson, Olympia, WA (US); Vincent J. Zimmer, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 14/964,067

(22) Filed: Dec. 9, 2015

(65) Prior Publication Data

US 2017/0168844 A1 Jun. 15, 2017

(51) Int. Cl.
| | | |
|---|---|---|
| *G06F 13/20* | (2006.01) | |
| *G06F 15/16* | (2006.01) | |
| *G06F 9/44* | (2018.01) | |
| *G06F 13/24* | (2006.01) | |
| *G06F 13/42* | (2006.01) | |

(52) U.S. Cl.
CPC .......... *G06F 9/4406* (2013.01); *G06F 9/4401* (2013.01); *G06F 13/24* (2013.01); *G06F 13/4282* (2013.01)

(58) Field of Classification Search
None
See application file for complete search history.

(56) References Cited

U.S. PATENT DOCUMENTS

| 5,694,582 A * | 12/1997 | Pearce | G06F 21/57 710/305 |
| 6,848,046 B2 * | 1/2005 | Zimmer | G06F 9/4401 710/18 |
| 7,660,977 B2 * | 2/2010 | Zimmer | G06F 8/65 713/1 |
| 2009/0183245 A1 | 7/2009 | Simpson | |
| 2012/0159028 A1 | 6/2012 | Zimmer | |
| 2012/0297057 A1 * | 11/2012 | Ghosh | G06F 21/575 709/224 |
| 2014/0040543 A1 * | 2/2014 | Natu | G06F 9/461 711/105 |
| 2015/0019850 A1 | 1/2015 | Rivera | |

OTHER PUBLICATIONS

"International Application Serial No. PCT/US2016/060887, International Search Report dated Feb. 22, 2017", 3 pgs.

(Continued)

*Primary Examiner* — Hyun Nam
(74) *Attorney, Agent, or Firm* — Schwegman Lundberg & Woessner, P.A.

(57) ABSTRACT

Various configurations and methods for disabling system management mode (SMM) and verifying a disabled status of SMM in a computing system are disclosed. In various examples, SMM may be disabled through a hardware strap, soft-straps, or firmware functions, and the indication of the SMM disabled status may be included in a model specific register (MSR) value accessible to the central processing unit (CPU). Additionally, techniques for verifying whether SMM is disabled in hardware or firmware, preventing access of SMM functionality, and handling secure software operations are disclosed.

26 Claims, 7 Drawing Sheets

(56) References Cited

OTHER PUBLICATIONS

"International Application Serial No. PCT/US2016/060887, Written Opinion dated Feb. 22, 2017", 7 pgs.
"A Tour Beyond BIOS Supporting an SMM Resource Monitor using the EFI Developer Kit II—White Paper", (2015), 29 pgs.
"Intel 7 Series / C216 Chipset Family Platform Controller Hub (PCH)—Datasheet", (Jun. 2012), 988 pgs.
"Introduction to Intel Architecture—The Basics", (2014), 10 pgs.
"SMI Transfer Monitor (STM) Unleashed", Vincent Zimmer's blog, (Aug. 18, 2015), 2 pgs.

\* cited by examiner

US 9,977,682 B2

SYSTEM MANAGEMENT MODE DISABLING AND VERIFICATION TECHNIQUES

TECHNICAL FIELD

Embodiments described herein generally relate to operating modes used in a computer system, and in particular, to a privileged operating mode executing with central processor unit (CPU) operations in the computer system.

BACKGROUND

System management mode (SMM) is one example of a special purpose operating mode provided by x86 architecture CPUs. SMM may be used for handling system-wide functions such as power management, system hardware control, or proprietary original equipment manufacturer (OEM)-designed code. It is typically intended for use by system firmware of an OEM, and is not intended to be third party extensible. SMM is considered as a "hidden" operating mode because the operating system (OS) and OS-executed software applications cannot see it or access it.

The presence of SMM as a privileged operating mode in the CPU, however, may allow the possibility that a rootkit or other malicious software could operate undetected in SMM, and gain complete access to system memory and functions. Because SMM is provided as a hardware function, it cannot be disabled in software by the operating system.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
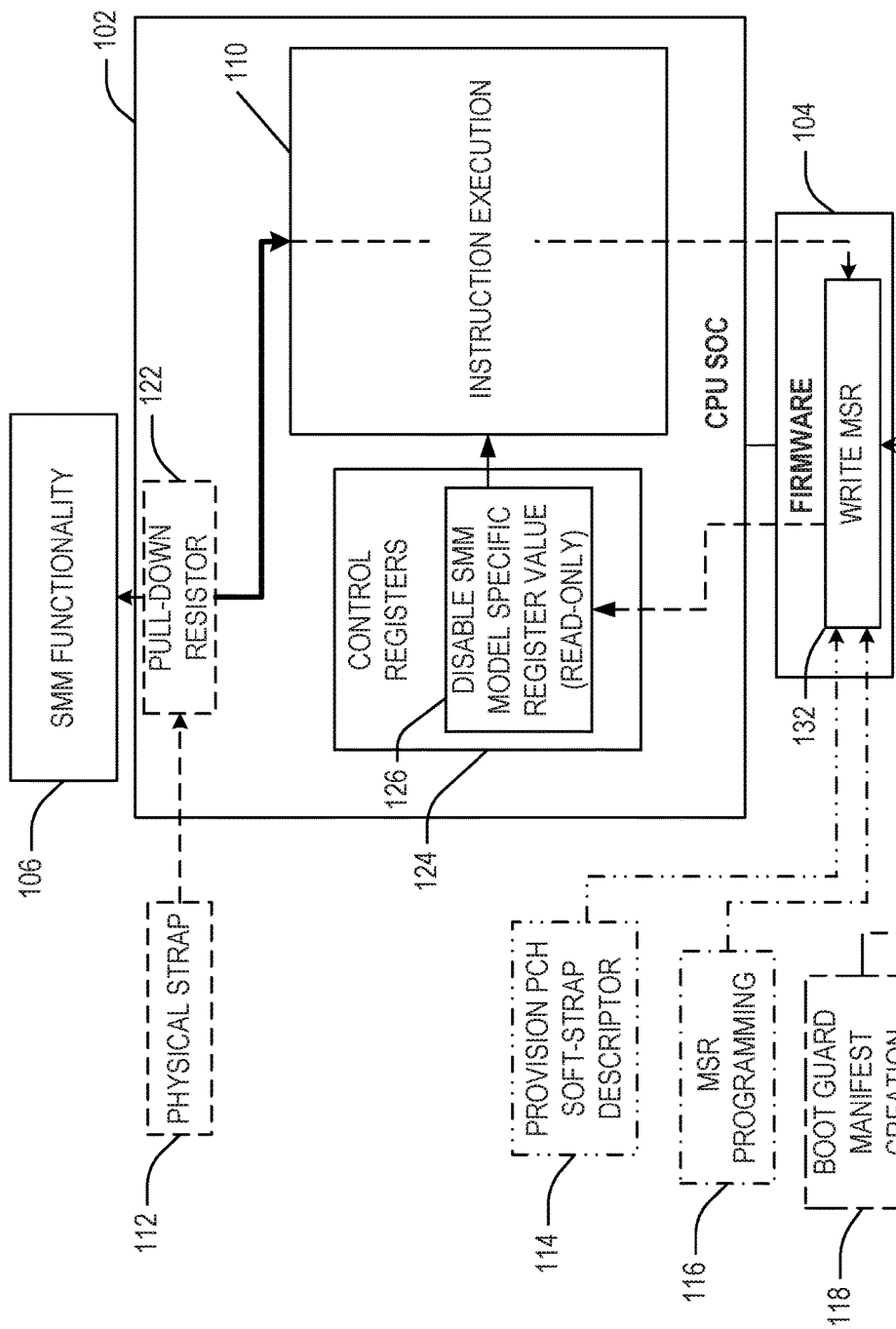
FIG. 1 illustrates a processor-based architectural diagram depicting various techniques for disabling SMM, according to an example.

In the following description, methods, configurations, and related devices and apparatuses are disclosed that provide the disabling of a special-purpose (e.g., privileged) operating mode of a CPU, and a verification of the disabling of this special-purpose operating mode. Specifically, the following includes various examples of disabling, verification, monitoring, and processing techniques for the privileged SMM operating mode included in x86 CPUs.

As described herein, the presently disclosed techniques and configuration provide a mechanism by which SMM may be disabled and verified as disabled, while also allowing a mechanism by which SMM may be enabled and operated for OEM-specific uses. For example, in one technique, the disabling of SMM may be implemented through use of a model-specific register (MSR) value, to provide configurability and an accurate status at a hardware level that cannot be bypassed or spoofed. In another technique, the disabling of SMM may be implemented through physical disabling techniques, but accompanied with the MSR value to indicate an accurate SMM status that may be verified by executed software.

Some OEMs have invested significant innovation into the use of SMM, to provide customized computer system configuration, manageability, and security use cases. Thus, many OEMs still require SMM functionality for newly manufactured computer systems. For example, SMM is used to support of power management features of older OSes with new hardware, offer backwards compatibility for hardware control functions, perform memory error logging, and the like. Thus, SMM is frequently used as a way to launch OEM-specific code and features at startup in system firmware, without requiring an in-box driver to be included in each OS release.

For other system builders who design vertically integrated OSes, firmware, and specialized hardware, many custom features are directly handled in the functionality of the OS. Thus, such system builders do not require backwards compatibility with older OSes and the various features that SMM enables. For these customers and security conscious system builders (including government agencies), SMM is defunct and its existence on a computer system increases business and operational risk. With the present techniques and configurations, using the same CPU hardware, OEMs, builders, and other customers may either choose to assume risk and maintain legacy platform features of SMM, or choose to disable SMM entirely.

One existing technique for disabling SMM capabilities relies on a special manufacture of the CPU chip, such as with use of a hardware "strap" (e.g., a pull-down resistor) physically added to the CPU system on chip (SOC) to disable the ability for the CPU to access or operate SMM. However, this requires a special fabrication of the CPU SOC to permanently disable SMM, which adds additional cost and complexity, and renders the chip unusable by customers or users who still desire SMM capabilities. Another existing technique for disabling the use of SMM relies on the use of a simple stub handler to operate in SMM, to always return a "RSM" resume instruction to resume from entry into SMM. However, even with a stub handler, the possibility remains that that an improperly configured system or security flaw could allow the execution of malicious code with SMM.

In some examples, the techniques described herein provide mechanisms by which SMM may be disabled or enabled by the OEM or system builder, without requiring physical fabrication of a specialized chip. Further, the present techniques described herein provide a mechanism by which the disabling of SMM may be verified, with hardware instructions, to allow applications and operation system features to ensure that security vulnerabilities from SMM execution is not possible. In some examples, the disabling of SMM may be provided by a physical mechanism implemented by the OEM or system builder (such as a physical strap), while allowing the disabling of SMM to be verified with hardware instructions and a register value.

FIG. 1 illustrates a processor-based architectural diagram depicting various techniques for disabling SMM, according to an example, with an illustration of various operations for disabling SMM in hardware. As shown, a CPU 102 includes functional units including an instruction execution unit 110 and control registers 124. The operating state of the CPU 102 is configured and implemented with use of platform firmware 104, such as from a system BIOS (basic input/output system) firmware or a Unified Extensible Firmware Interface (UEFI) firmware. For simplicity, a number of internal components and functions of the CPU 102 are not depicted.

As illustrated, SMM functionality 106 is provided with an interaction to the CPU 102, including a path to perform execution of certain instructions in SMM with the instruction execution unit 110. The SMM functionality 106, also referred to as "ring-2", provides execution of the instructions with the instruction execution unit 110 of the CPU 100 in a special, privileged operating mode. The CPU 100 may include a plurality of operating modes, including a real mode, protected mode, long mode (64 bit), and special operating modes in addition to SMM.

As discussed above, SMM is a special-purpose operating mode provided for handling system-wide functions like power management, system hardware control, or proprietary OEM-designed code. The SMM functionality 106 is hidden to operating systems, as the operating system (OS) and higher level software applications cannot see SMM or access SMM. Thus, if SMM is enabled, the execution of the SMM functionality 106 in the instruction execution unit 110 in this privileged operating mode cannot be blocked, controlled, or detected by the operating system.

The SMM functionality 106 may be implemented by the execution of instructions loaded by the firmware 104. For example, most BIOS implementations that leverage the SMM functionality 106 simply register a monolithic section of code that is created during the build of the BIOS to support a specific function or set of functions particular to systems that use the BIOS. In some examples, the SMM functionality 106 operates in response to activation of an SMI (System Management Interrupt) signal to the CPU 102 to enter SMM.

The following describes four techniques by which the execution of the SMM functionality 106 may be disabled, for a CPU configuration that has SMM functionality enabled by default. It will be apparent that other techniques may be provided with variations of hardware and software modifications.

In the following examples, straps may be embodied by programming into the flash descriptors of the serial peripheral interface (SPI) flash memory (e.g., NOR flash memory), embodied by one-time programmable fuses set by a manufacturer to be in the enabled/disabled state, or embodied by physical strapping lines, where a pin on the chip is manufactured to be in a given polarity (e.g., pulled up to high voltage or pulled down to ground) to designate the state of the SMM capability in the CPU. In each of these strapping cases, the CPU samples the value upon a restart (booting) of the computing system, so that the SMM capability is enabled or disabled prior to running any third party system firmware.

As a first technique, a physical strap 112 may be added to the CPU SOC by the OEM or system builder to physically disable the SMM functionality 106 from operating. For example, a pull-down resistor 122 may serve as hardware strapping to stop the execution of the SMM functionality 106 as a result of an SMI signaling. This differs from existing techniques, as the hardware strapping may be selectively added by OEMs or system builders, rather than fabricating the CPU SOC in a permanent SMM-disabled state. Based on the detection of the physical strap 112, a function may be invoked from firmware to write a model specific register (MSR) value that indicates that SMM is disabled. In FIG. 1, this is illustrated by a write MSR function 132 implemented in the firmware 104, as the firmware 104 performs one or more operations to set (e.g., write) a read-only Disable SMM MSR value 126 in the control registers 124. Thus, the write MSR function 132 is responsible for setting the Disable SMM MSR value 126, and in turn, the instruction execution unit 110 uses the Disable SMM MSR value 126 to prevent execution of the SMM functionality 106.

As a second technique, a platform controller hub (PCH) chipset soft strap 114 may be provided through a management engine (ME) descriptor, which is loaded to establish the Disable SMM MSR value 126. Soft straps are setting functions provided in firmware, that configure specific functions within the chipset early in the boot process before BIOS/UEFI or software intervention.

Figure 2:
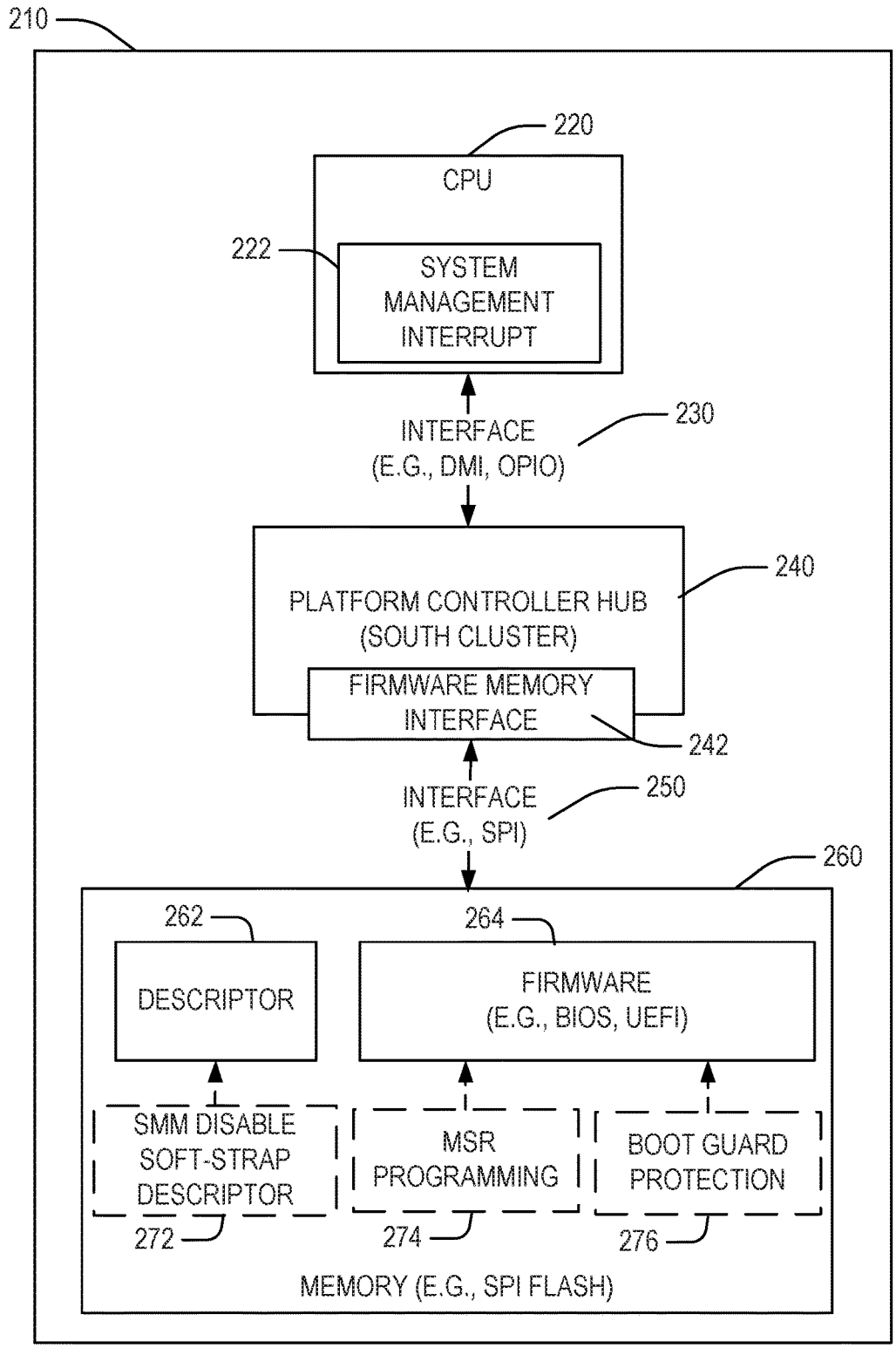
FIG. 2 illustrates a processor-based architectural diagram depicting flash-stored firmware instructions for disabling SMM, according to an example.

For example, as explained further in FIG. 2, an ME descriptor may be provided in an SPI flash, and loaded to write a model specific register (MSR) value in the control registers 124 with the write MSR function 132. As a result, the instruction execution unit 110 may use the Disable SMM MSR value 126 to prevent execution of the SMM functionality 106.

As a third technique, a SMM disabling function may be provided as part of hardware-based code execution protection, such as including a SMM disabling function implemented as part of a "boot guard" manifest creation 118. For example, a boot guard function may be executed to operate an authenticated code module that verifies trusted firmware code, such as to prevent the installation of replacement firmware and BIOS code. The boot guard manifest may be used with a firmware function to enable or disable certain features of the SMM functionality 106. In an example, the boot guard manifest is a data structure in the SPI flash memory that is signed by the manufacturer whose public key hash is stored in one-time programmable fuses. In a further example, the Boot Guard Authenticated Code Module (ACM) may execute first upon reset and, depending upon the state of the value in the manifest (either enabled or disabled), the ACM programs the corresponding state of the MSR.

Thus, in the case of disabling SMM entirely, the boot guard manifest may cause the firmware 104 to write an MSR value in the control registers 124 with the write MSR function 132, such as writing the Disable SMM MSR value 126. Again, the instruction execution unit 110 may use the Disable SMM MSR value 126 to prevent execution of the SMM functionality 106.

As a fourth technique, an early firmware flow may be operated to enable or provision SMM functionality, or disable SMM functionality, via MSR programming 116 to directly write MSR values in the control registers 124. For example, the write MSR function 132 may be invoked to disable MSR with the Disable SMM MSR value 126. This value may be established as read-only to prevent any modification. This may be implemented based on the behavior provided by MSR. For example, the SMM enabled/disable MSR state may be write-once but read many time. Such MSR behavior is enforced by the core microcode in the CPU. Thus, the read-only behavior of the Disable SMM MSR value 126 allows other parties to ascertain that the state of SMM has been set, in addition to whether it is enabled or disabled.

Regardless of which implementation is used, a register status value such as the read-only Disable SMM MSR value 126 may be provided to verify the status of the SMM as disabled or enabled. As further discussed herein, this indication may allow host software to make a risk decision for a given platform on whether to execute certain functions if SMM is enabled. (For example, if SMM is enabled, the risk is higher of opaque SMM rootkits/malware having infected the system, and thus certain operating system features or application software functions may wish to be avoided.)

In another example, a capID may be used to indicate the status of the SMM enabling or disabling. The capID is a register that the firmware may use to indicate the SMM status. For example, a baseboard management controller (BMC) may ascertain if the capID for SMM is set for disabled as the capID is implemented as a control status register (CSR). CSRs may be read via the Platform Environment Control Interface (PECI) interface which is connected to the BMC/ME.

FIG. 2 illustrates a processor-based architectural diagram depicting flash-stored firmware instructions for disabling SMM, according to an example. As shown, FIG. 2 includes an illustration of a high-level system architecture 210 including a CPU 220, a PCH chipset 240, and flash memory (e.g., SPI flash memory) 250. The CPU 220 is connected to the PCH chipset 240 through a chipset interface 230 such as direct media interface (DMI) or On Package I/O (OPIO), allowing the CPU 220 to communicate with the PCH chipset 240. The CPU 220 also includes a system management interrupt 222 (SMI) which is used to trigger SMM operations when SMM is enabled.

In some configurations, the CPU 220 and PCH 240 are included within a common SOC; in other examples, the CPU 220 and PCH chipset 240 are embodied by separate components. The PCH chipset 240 is configured to interface with the memory 260 (e.g., serial peripheral interface (SPI) flash), through use of a firmware memory interface 242 and a memory communication interface 250 such as SPI.

The descriptor or firmware functions 262, 264 included within the memory 260 are loaded by the PCH chipset 240 and provided to the CPU 220, and may be extended for disabling of the SMM functionality as discussed above. As discussed with reference to FIG. 1 above, such techniques for disabling SMM functionality from the memory 260 may include SPI descriptors (such as SMM disable soft-strap descriptor 272), overt early firmware flow through MSR programming 274, or overt early firmware flow through boot guard manifest protection 276 to program the MSR.

For example, the SMM disable soft-strap descriptor 272 may be included in the descriptor 262 by the manufacturer. The descriptor 262 is a data structure that is programmed on the SPI flash, which describes the layout of the memory 260 as well as defines configuration parameters for the PCH chipset 240. The information stored in the descriptor 262 may only be written during the manufacturing process, as its read/write permissions are set to Read-Only when the computer leaves the manufacturing floor. Accordingly, the use of the SMM disable soft-strap descriptor 272 may provide an unchangeable mechanism by which to disable SMM for use of resulting computer system.

Also for example, the MSR programming 274 or the boot guard manifest protection 276 may be included within the firmware 264. The MSR programming may include specific code that writes an MSR value in the control registers 124. Likewise, the boot guard manifest protection 276 may include an authenticated code module that writes an MSR value in the control registers. Either of these values in the firmware 264 may be modified by the system builder or OEM.

The MSR value informs the core microcode flow of the processor, so that when the MSR SMM disabled register value (e.g., Disable SMM MSR value 126) is true, further commands to enter SMM (such as receipt of the SMI 222) will be ignored. As a result, SMM functionality will not be loaded or exposed after the MSR SMM disabled register value is set to true.

Additionally, once the SMM functionality is disabled with the MSR SMM disabled register value, the SMM functionality cannot be re-enabled. This will be handled in phase-5 of the 10 nm (and beyond) reset flow of the CPU 220. That reset flow is broken into 3 distinct aspects. Phases 1-5 are pCode driven, phase-6 is uCode driven, and phase-7 is firmware (e.g., BIOS) driven. Accordingly, SMM capabilities may be disabled prior to uCode, and cannot be patched in. It will be understood that like techniques may be used to disable SMM according to processor constraints and hardware architecture requirements.

Upon disabling SMM, the MSR SMM disabled register value (e.g., Disable SMM MSR value 126) is established with the correct status value so that any ring( ) (kernel), ring3 (application), or hypervisor code executed by the CPU 220 may read this MSR value. Thus, the operating system and associated software may read the MSR value to determine if the platform has SMM enabled (along with the possibility of SMM-borne vulnerabilities).

In addition to removing the capability of the SMI 222 in the CPU 220, the MSR SMM disabled register value may be used to assess the trustworthiness of the platform based on whether SMM is enabled or disabled. As a result, operating system and application software may include specific logic to handle cases where SMM is enabled or disabled.

Figure 3:
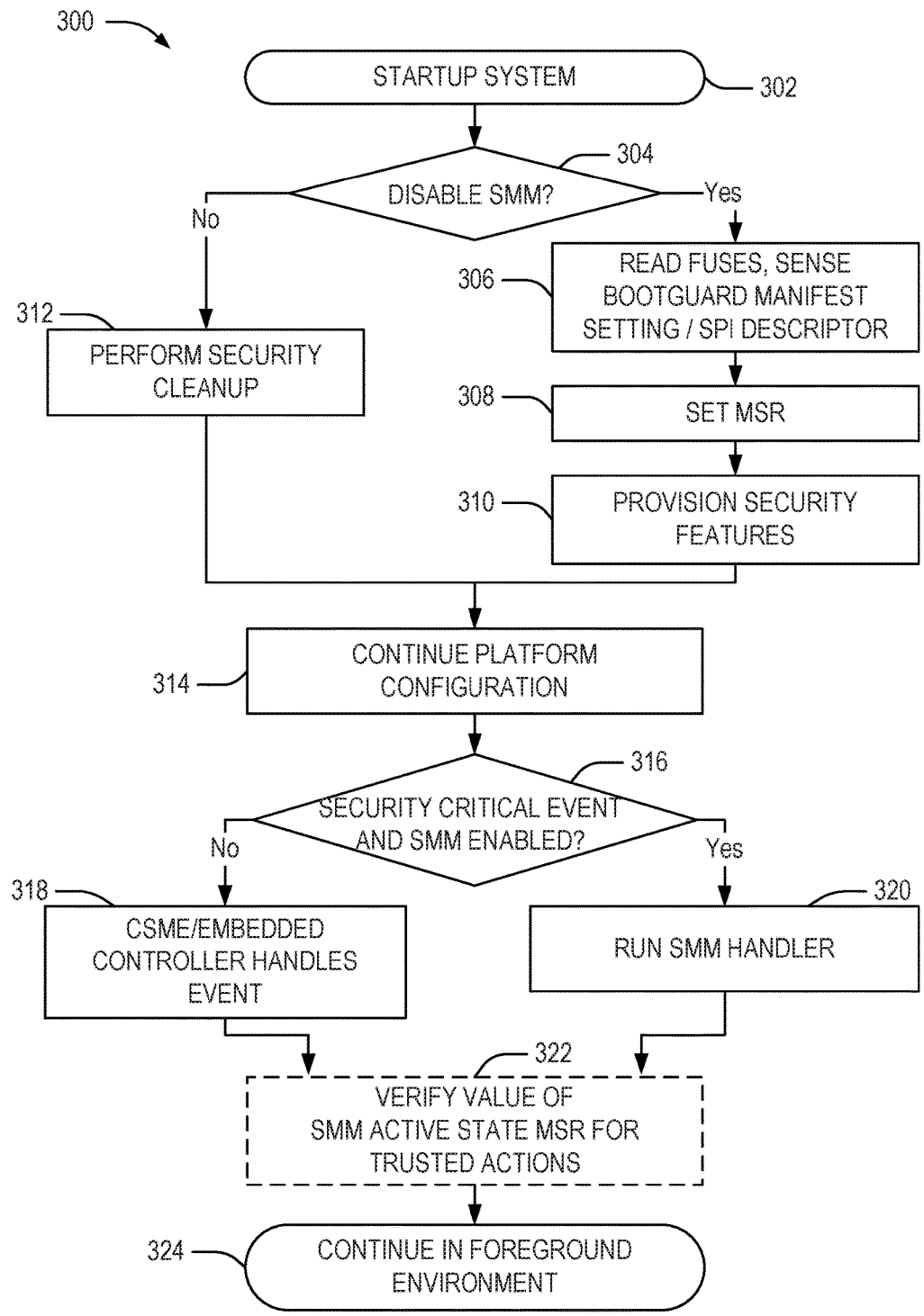
FIG. 3 illustrates a flowchart for verification of disabling or enabling SMM, according to an example.

FIG. 3 illustrates a flowchart 300 for verification of disabling or enabling SMM, according to an example. As shown, as an initial state, the computing system is in a startup state (state 302). Next, a decision is made of whether SMM is to be disabled or enabled (decision 304). If SMM is indicated to be enabled, then security cleanup operations may be performed (operation 312). If SMM is to be disabled, then operations are performed to detect the mechanism to disable SMM, such as reading soft-strap descriptors (e.g., fuses), firmware settings (e.g., boot guard manifest settings, MSR programming) (operation 306). Inside of the CPU, the capability to expose setting SMM, receiving the System Management Interrupt (SMI) signal, and any SMM flows will be blocked in response to the MSR being set to a disabled state. If the MSR is set to an enabled state, SMM flows may be exposed. Next, the MSR indication is set (operation 308), and security features may be provisioned in the computing system (operation 310). Further platform configuration may occur (operation 314) based on the SMM enabled or disabled state, or other configuration parameters indicated from the system firmware or software.

As the computing system operates, various checks or evaluations may be performed to determine if a security sensitive event (e.g., security critical event) occurs, and SMM is enabled (decision 316). The determination of whether SMM is enabled may occur again through the MSR value, and this determination may occur as a result of an application event, operating system event, or lower-level hardware-triggered event.

If SMM is enabled during the security sensitive event, an SMM handler may be operated (operation 320), to handle or prevent certain operations from occurring. If SMM is disabled during the security sensitive event, then a CSME (converge security management engine) or other embedded controller may handle the event (operation 318). Thus, a microcontroller in the SOC may be used to handle the event, in a similar fashion to how logging is performed in existing firmware code. The foreground environment will continue operations (conclusion 324). If the operating system or a particular application is worried about trust, further actions may be taken to verify the value of the SMM Active State MSR for trusted actions (operation 322).

Figure 4:
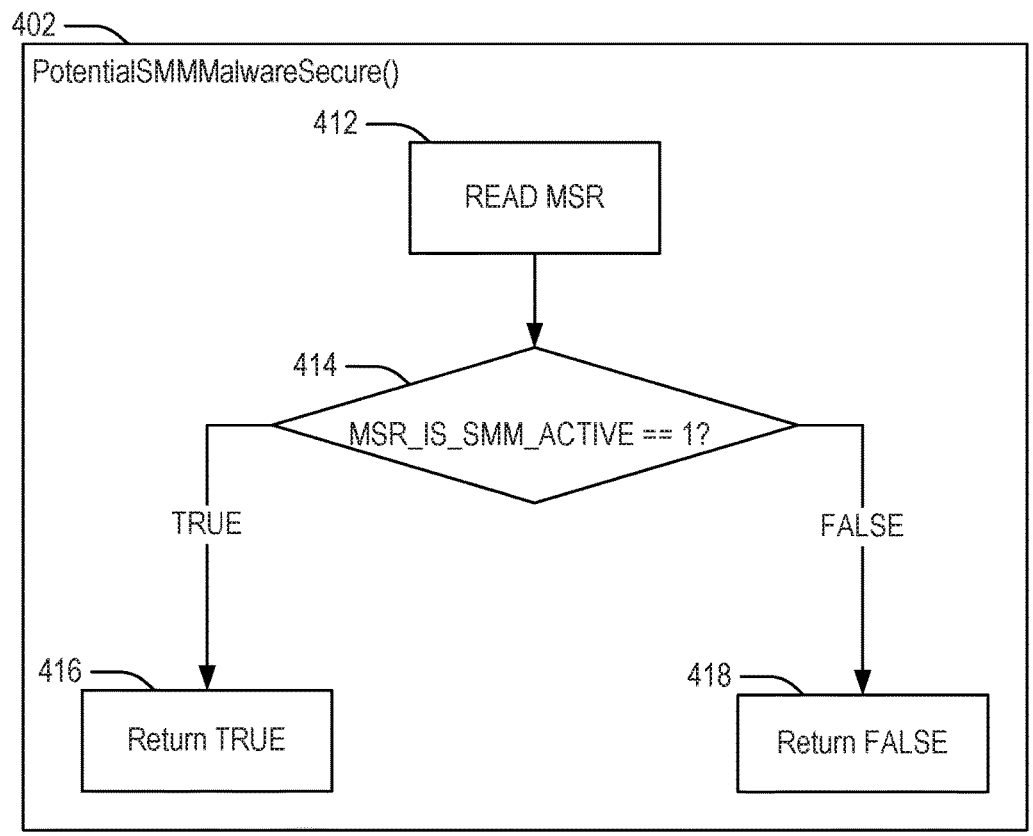
FIG. 4 illustrates a method for verifying a status of disabled or enabled SMM state with a register value, according to an example.

FIG. 4 illustrates a method for verifying a status of disabled or enabled SMM state with a register value, according to an example. As shown, this method provides an example of a logic flow, which may be implemented in security middleware or trusted OSes. The illustrated function 402, titled PotentialSMMMalwareSecure( ), will return either TRUE (operation 416) or FALSE (operation 418) depending on whether the Disable SMM MSR value, here represented by the value MSR_IS_SMM_ACTIVE, is true. In an example, the function 402 may include operations to read the MSR (operation 412), perform an evaluation of whether the MSR_IS_SMM_ACTIVE value is true (e.g., set to 1) (evaluation 414), then return true (operation 416) or false (operation 418) depending on the value of MSR_IS_SMM_ACTIVE.

The logic flow depicted by FIG. 4 may also be represented with the following pseudo code:

```
BOOLEAN
PotentialSmmMalwareSecure( )
{
int Value;
if ReadMsr( MSR_IS_SMM_ACTIVE, &Value);
if (Value &1) return TRUE;
else return FALSE;
}
```

The use of a read MSR instruction in the CPU to read the MSR_IS_SMM_ACTIVE value enables an architectural capability to be defined and verified, so that software may read this value to determine whether the capability exists. This provides a feasible mechanism of indicating the status to system operations.

In an example, the MSR_IS_SMM_ACTIVE value or a similar MSR value may include multiple bits instead of a binary value. For example, the value may indicate whether the hardware is capable of enabling SMM, and whether the hardware has SMM enabled or disabled. In further examples, the MSR_IS_SMM_ACTIVE value may also be included in a hash, such as in a hashed state of one or more register values that is used to communicate and indicate the state of the machine and the machine configuration. In an example, for a Trusted Computing Group standard-compliant "measured boot," the state of code and system configuration may be recorded into the Platform Configuration Register (PCR) of a Trusted Platform Module (TPM). An example of recording the MSR_IS_SMM_ACTIVE state may be implemented as follows:
PCR[1]=SHA-256 (PCR[1]||MSR_IS_SMM_ACTIVE).

Figure 5:
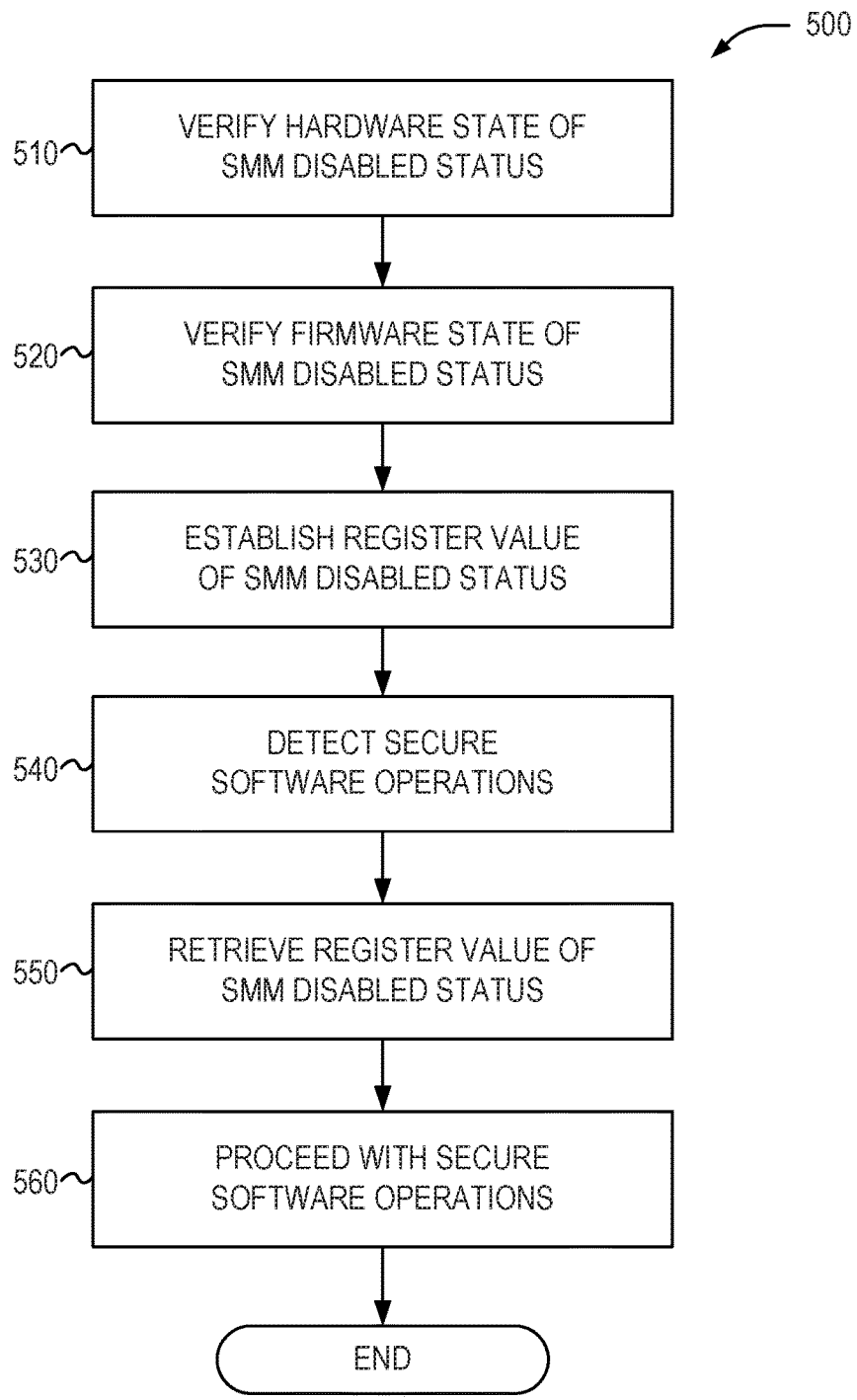
FIG. 5 illustrates a flowchart of a method for disabling SMM and verifying a disabled SMM state, according to an example.

FIG. 5 illustrates a flowchart 500 of a method for disabling and verifying SMM in hardware, according to one example. As shown, the following operations of flowchart 500 may be implemented by a combination of firmware and software functions to verify and implement SMM disabling.

The operations of flowchart 500 include operations to verify the hardware state of a SMM disabled status (operation 510) and verify (and as needed, implement) the firmware state of SMM disabled status (operation 520). For example, the operations to verify the hardware state of the SMM disabled status may occur through reading one or more field programmable fuses to determine if a hardware setting is preventing execution of SMM functionality. Also for example, the operations to verify the firmware state of the SMM disabled status may occur through implementing MSR programming from firmware, or implementing a boot guard manifest setting from firmware. As a result of the verification that SMM is disabled, a CPU register value is established to indicate that SMM is disabled (operation 530).

As the operation of the computer system proceeds, the computer system (e.g., a security software function, or functions of the operating system) will detect secure software operations (operation 540). The register value of the SMM is obtained (operation 550), to verify that SMM is disabled. Upon verification of the SMM disabled status, the computer system may proceed with the secure software operations (operation 560). Further processing, verifications, and functions may occur in the operating system and in secure software based on whether SMM is enabled or disabled.

While many of the examples described herein refer to x86 architectures and x86 architecture-specific features of SMM, it will be understood that the presently disclosed techniques will also apply to other architectures and protected modes. For example, in relation to an ARM-based architecture, which has adopted a UEFI platform initialization (PI) model, similar security issues may apply for protected modes similar to SMM that may wish to be disabled. As a result, the presently described hard and soft strapping, firmware implementation, reporting, and verification mechanisms may be used to disable the protected mode and verify the disabling of the protected mode.

Figure 6:
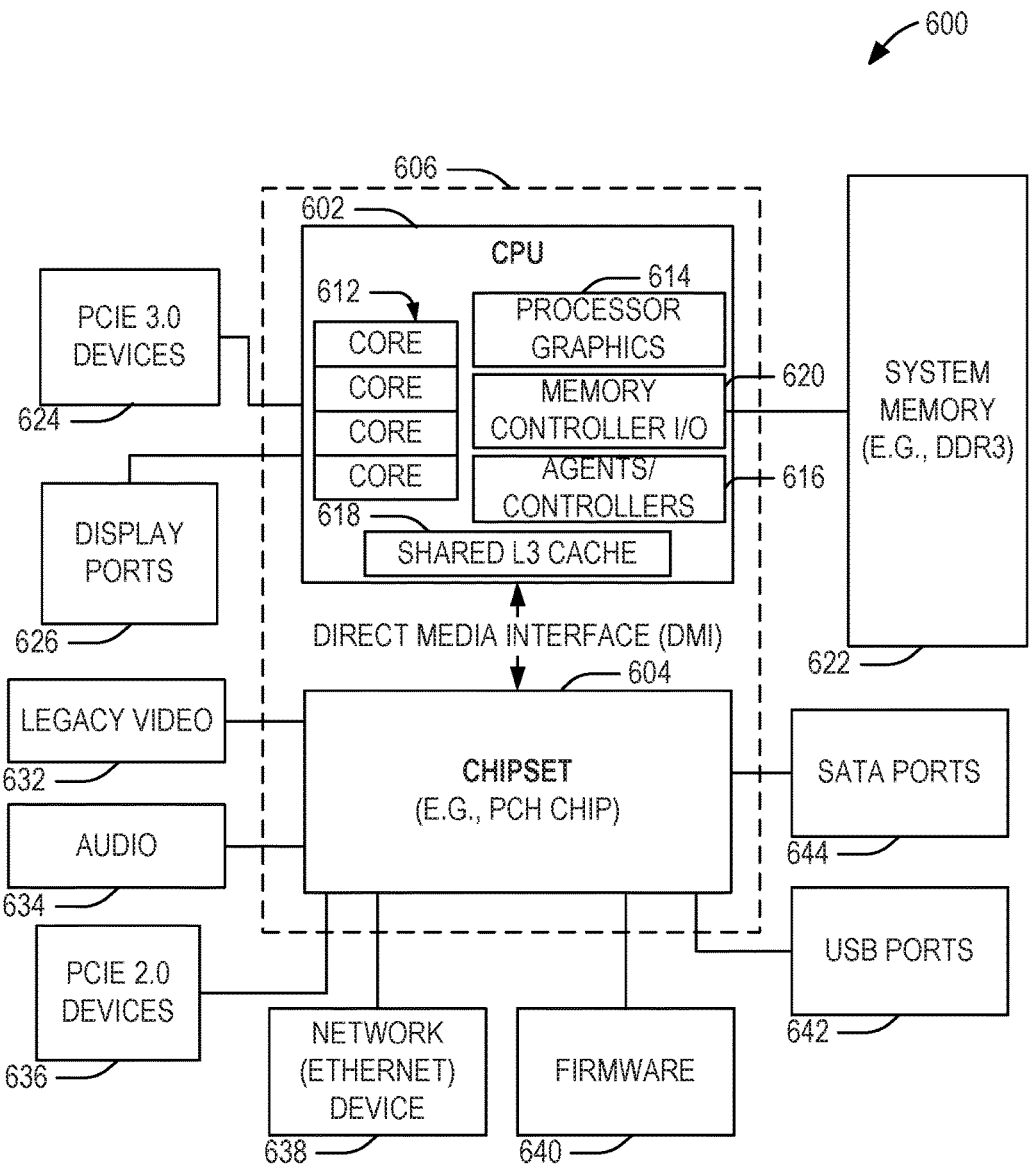
FIG. 6 illustrates a block diagram for an example processor and chipset architecture upon which SMM functionality may be disabled or operated within, according to an example.

FIG. 6 is a block diagram illustrating an example processor and chipset architecture 600, in which the presently disclosed techniques and configurations may be implemented (including in which SMM functionality may be disabled or operated). In the architecture 600, a CPU 602 includes one or more cores 612 (e.g., two independent cores, four independent cores) to perform execution of instructions, including with features such as multithreading. The CPU 602 further includes a shared L3 cache 618 used for caching instructions, data, and other memory values among the cores 612. The CPU may also include functionality for: processor graphics 614 to process and communicate data with display ports 626; agents/controllers 616 to process and communicate data with a set of PCI Express (PCIE) 3.0 devices 624; and memory controller I/O 620 to interface with system memory 622. Accordingly, the CPU may directly interface with the set of PCIE 3.0 devices 624 and the display ports 626 without use of a chipset. In some examples, an SOC may be designed to incorporate features of the CPU 602 and the chipset 604 onto a single SOC 606.

The CPU 602 may communicate with a chipset (e.g., a platform controller hub (PCH) chip-based chipset) 604 through a direct media interface (DMI) or other link, bus, or connection. The chipset 604 is configured to process functions from a variety of peripherals, devices, and outputs, such as legacy video features 632, audio features 634, PCIE 2.0 devices 636, network (e.g., Ethernet) devices 638, platform firmware 640, universal serial bus (USB) ports 642, and Serial ATA (SATA) ports 644. This listing of devices is provided for illustration purposes, as it will be understood that a variety of other devices, inputs, and outputs may be controlled or interfaced with the chipset 604.

Figure 7:
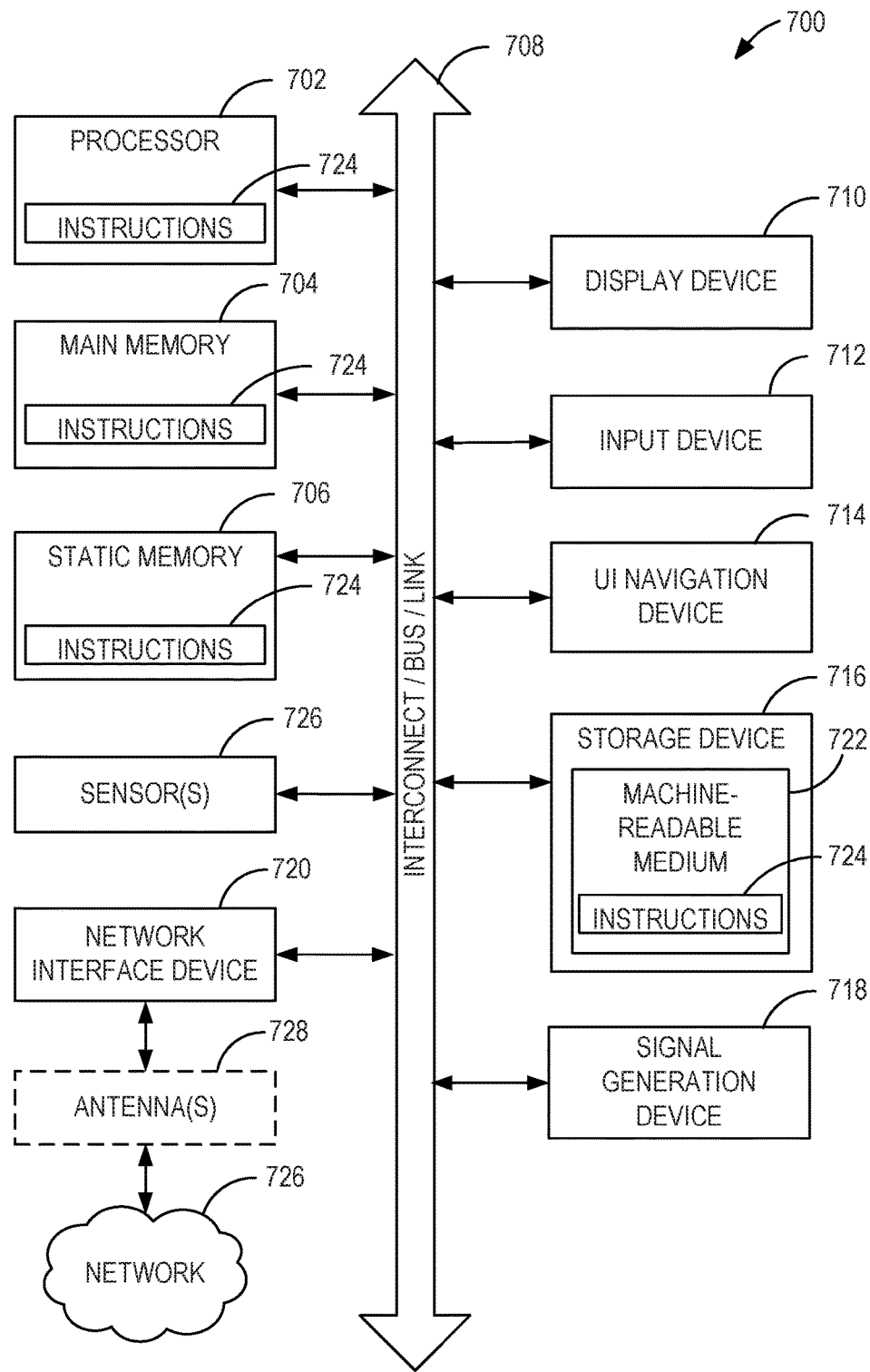
FIG. 7 illustrates a block diagram for an example computer system upon which any one or more of the techniques (e.g., operations, processes, methods, and methodologies) discussed herein may be performed, according to an example.

FIG. 7 is a block diagram illustrating a machine in the example form of a computer system 700, within which a set or sequence of instructions may be executed to cause the machine to perform any one of the methodologies discussed herein, according to an example embodiment. The machine may be an personal computer (PC), a tablet PC, a hybrid tablet/notebook PC, a personal digital assistant (PDA), a mobile telephone or smartphone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via an interconnect 708 (e.g., a link, a bus, etc.). The computer system 700 may further include a video display unit 710, an alphanumeric input device 712 (e.g., a keyboard), and a user interface (UI) navigation device 714 (e.g., a mouse). In an example, the video display unit 710, input device 712 and UI navigation device 714 are incorporated into a touch screen display. The computer system 700 may additionally include a storage device 716 (e.g., a drive unit), a signal generation device 718 (e.g., a speaker), an output controller 732, a power management controller 734, a network interface device 720 (which may include or operably communicate with one or more antennas 730, transceivers, or other wireless communications hardware), and one or more sensors 726, such as a global positioning system (GPS) sensor, compass, accelerometer, location sensor, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 728 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Such components are tangible entities (e.g., hardware) capable of performing specified operations and may be configured or arranged in a certain manner In an example, circuitry or circuit sets may be arranged (e.g., internally or with respect to external entities such as other circuitry or circuit sets) in a specified manner as such components. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the component may be embodied or programmed by instructions of a machine readable medium. In an example, software, when executed by the underlying hardware of the component, causes the hardware to perform the specified operations. Thus, such components, modules, or mechanisms are understood to encompass a tangible entity, be that an entity that is physically constructed, specifically configured, temporarily configured, adapted, or programmed to operate in a specified manner or to perform part or all of any operations described herein.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is at least one machine readable storage medium, comprising a plurality of instructions that, responsive to being executed with processor circuitry of a computing device, cause the computing device to: perform a determination of whether system management mode (SMM) functionality is to be disabled from execution by the processor circuitry; and store a value in a model-specific register to indicate an SMM disabled state, in response to a determination that the SMM functionality is to be disabled from execution by the processor circuitry, wherein the value that indicates the SMM disabled state is established as read-only in the model-specific register.

In Example 2, the subject matter of Example 1 optionally includes, the plurality of instructions further comprising additional instructions that: prevent execution of the SMM functionality from a system management interrupt (SMI) of the processor circuitry, in response to the value in the model-specific register indicating the SMM disabled state.

In Example 3, the subject matter of any one or more of Examples 1-2 optionally include, wherein the SMM functionality is indicated to be disabled from execution from a physical hardware strap located in the processor circuitry, and wherein operations that perform the determination whether the SMM functionality is to be disabled include detection of the physical hardware strap.

In Example 4, the subject matter of any one or more of Examples 1-3 optionally include, wherein the SMM functionality is indicated to be disabled from a soft-strap descriptor accessed by a chipset of the processor circuitry, the soft-strap descriptor loaded from a descriptor stored on a serial peripheral interface (SPI) flash memory, and wherein operations that perform the determination whether the SMM functionality is to be disabled include detection of the soft-strap descriptor.

In Example 5, the subject matter of any one or more of Examples 1-4 optionally include, wherein the SMM functionality is indicated to be disabled from model-specific register programming included in firmware executed by the processor circuitry, wherein the model-specific register programming included in the firmware causes the value in the model-specific register to be set to indicate the SMM disabled state.

In Example 6, the subject matter of any one or more of Examples 1-5 optionally include, wherein the SMM functionality is indicated to be disabled from boot guard manifest programming included in firmware executed by the processor circuitry, wherein the boot guard manifest programming included in the firmware causes the value in the model-specific register to be set to indicate the SMM disabled state.

In Example 7, the subject matter of any one or more of Examples 1-6 optionally include, wherein the value in the model-specific register is configured to indicate the SMM disabled state or an SMM enabled state.

In Example 8, the subject matter of Example 7 optionally includes, the plurality of instructions further comprising additional instructions that: store the value in the model-specific register to indicate the SMM enabled state, in response to a determination that the SMM functionality is not disabled from execution by the processor circuitry, wherein the value that indicates the SMM enabled state is established as read-only in the model-specific register.

In Example 9, the subject matter of any one or more of Examples 1-8 optionally include, wherein the value in the model-specific register is provided for use in the processor circuitry in a hash of one or more register values, the one or more register values indicating a state of configuration for the computing device.

In Example 10, the subject matter of any one or more of Examples 1-9 optionally include, the plurality of instructions further comprising additional instructions that: hash the value in the model-specific register to produce a hashed register value; and store the hashed register value.

Example 11 is a computing system, comprising: a central processing unit (CPU), comprising an instruction execution unit and a plurality of control registers, the plurality of control registers including a model-specific register to indicate an system management mode (SMM) state; and a storage medium comprising a plurality of instructions that, responsive to being executed with the instruction execution unit of the CPU, cause the computing system to: perform a determination of whether system management mode (SMM) functionality is to be disabled from execution by the CPU; and store a value in the model-specific register to indicate an SMM disabled state, in response to a determination that the SMM functionality is to be disabled from execution by the CPU, wherein the value in the model-specific register that indicates the SMM disabled state is established as read-only in the model-specific register.

In Example 12, the subject matter of Example 11 optionally includes, the plurality of instructions further comprising additional instructions that: prevent execution of the SMM functionality from a system management interrupt (SMI) of the CPU, in response to the value in the model-specific register indicating the SMM disabled state.

In Example 13, the subject matter of any one or more of Examples 11-12 optionally include, wherein the SMM functionality is indicated to be disabled from execution from a physical hardware strap located in the CPU, and wherein operations that perform the determination whether the SMM functionality is to be disabled include detection of the physical hardware strap.

In Example 14, the subject matter of any one or more of Examples 11-13 optionally include, further comprising a chipset that is operably coupled to the CPU, and a serial peripheral interface (SPI) flash memory that is operably coupled to the chipset, wherein the SMM functionality is indicated to be disabled from a soft-strap descriptor accessed by the chipset, the soft-strap descriptor loaded from a descriptor stored on the SPI flash memory, and wherein operations that perform the determination whether the SMM functionality is to be disabled include detection of the soft-strap descriptor.

In Example 15, the subject matter of any one or more of Examples 11-14 optionally include, wherein the SMM functionality is indicated to be disabled from model-specific register programming included in firmware executed by the CPU, wherein the model-specific register programming included in the firmware causes the value in the model-specific register to be set to indicate the SMM disabled state.

In Example 16, the subject matter of any one or more of Examples 11-15 optionally include, wherein the SMM functionality is indicated to be disabled from boot guard manifest programming included in firmware executed by the CPU, wherein the boot guard manifest programming included in the firmware causes the value in the model-specific register to be set to indicate the SMM disabled state.

In Example 17, the subject matter of any one or more of Examples 11-16 optionally include, wherein the value in the model-specific register is configured to indicate the SMM disabled state or an SMM enabled state.

In Example 18, the subject matter of Example 17 optionally includes, the plurality of instructions further comprising additional instructions that: store the value in the model-specific register to indicate the SMM enabled state, in response to a determination that the SMM functionality is not disabled from execution by the CPU, wherein the value that indicates the SMM enabled state is established as read-only in the model-specific register.

In Example 19, the subject matter of any one or more of Examples 11-18 optionally include, wherein the value in the model-specific register is provided for use in the CPU in a hash of one or more register values, the one or more register values indicating a state of configuration for the computing system.

In Example 20, the subject matter of any one or more of Examples 11-19 optionally include, the plurality of instructions further comprising additional instructions that: hash the value in the model-specific register to produce a hashed register value; and store the hashed register value.

Example 21 is a method, which when performed by processor circuitry of a computing system, causes the computing system to perform electronic operations including: performing a determination of whether system management mode (SMM) functionality is to be disabled from execution by the processor circuitry; and storing a value in a model-specific register to indicate an SMM disabled state, in response to a determination that the SMM functionality is to be disabled from execution by the processor circuitry, wherein the value that indicates the SMM disabled state is established as read-only in the model-specific register.

In Example 22, the subject matter of Example 21 optionally includes, the electronic operations further including: preventing execution of the SMM functionality from a system management interrupt (SMI) of the processor circuitry, in response to the value in the model-specific register indicating the SMM disabled state.

In Example 23, the subject matter of any one or more of Examples 21-22 optionally include, wherein the SMM functionality is indicated to be disabled from a hardware or software strap located in the processor circuitry.

In Example 24, the subject matter of any one or more of Examples 21-23 optionally include, wherein the SMM functionality is indicated to be disabled from execution from a physical hardware strap located in the processor circuitry, and wherein operations that perform the determination whether the SMM functionality is to be disabled include detection of the physical hardware strap.

In Example 25, the subject matter of any one or more of Examples 21-24 optionally include, wherein the SMM functionality is indicated to be disabled from a soft-strap descriptor accessed by a chipset of the processor circuitry, the soft-strap descriptor loaded from a descriptor stored on a serial peripheral interface (SPI) flash memory, and wherein operations that perform the determination whether the SMM functionality is to be disabled include detection of the soft-strap descriptor.

In Example 26, the subject matter of any one or more of Examples 21-25 optionally include, wherein the SMM functionality is indicated to be disabled from model-specific register programming included in firmware executed by the processor circuitry, wherein the model-specific register programming included in the firmware causes the value in the model-specific register to be set to indicate the SMM disabled state.

In Example 27, the subject matter of any one or more of Examples 21-26 optionally include, wherein the SMM functionality is indicated to be disabled from boot guard manifest programming included in firmware executed by the processor circuitry, wherein the boot guard manifest programming included in the firmware causes the value in the model-specific register to be set to indicate the SMM disabled state.

In Example 28, the subject matter of any one or more of Examples 21-27 optionally include, wherein the value in the model-specific register is configured to indicate the SMM disabled state or an SMM enabled state.

In Example 29, the subject matter of Example 28 optionally includes, further comprising: storing the value in the model-specific register to indicate the SMM enabled state, in response to a determination that the SMM functionality is not disabled from execution by the processor circuitry, wherein the value that indicates the SMM enabled state is established as read-only in the model-specific register.

In Example 30, the subject matter of any one or more of Examples 21-29 optionally include, wherein the value in the model-specific register is provided for use in the processor circuitry in a hash of one or more register values, the one or more register values indicating a state of configuration for the computing system.

In Example 31, the subject matter of any one or more of Examples 21-30 optionally include, further comprising: hashing the value in the model-specific register to produce a hashed register value; and storing the hashed register value.

Example 32 is a machine-readable medium including instructions, which when executed by a computing system, cause the computing system to perform any of the methods of Examples 21-31.

Example 33 is an apparatus comprising means for performing any of the methods of Examples 21-31.

Example 34 is an apparatus, comprising: means for performing a determination of whether system management mode (SMM) functionality is to be disabled from execution by a processor circuitry; and means for storing a value to indicate an SMM disabled state, in response to a determination that the SMM functionality is to be disabled from execution by the processor circuitry, wherein the value that indicates the SMM disabled state is established as read-only.

In Example 35, the subject matter of Example 34 optionally includes, further comprising: means for preventing execution of the SMM functionality from a system management interrupt (SMI) of the processor circuitry, in response to the value that indicates the SMM disabled state.

In Example 36, the subject matter of any one or more of Examples 34-35 optionally include, further comprising: physical hardware strap means located in the processor circuitry for indicating the SMM functionality is to be disabled from execution, wherein the determination that the SMM functionality is to be disabled includes detection of the physical hardware strap means.

In Example 37, the subject matter of any one or more of Examples 34-36 optionally include, further comprising: soft-strap descriptor means for indicating the SMM functionality is to be disabled from execution, wherein the determination that the SMM functionality is to be disabled includes detection of the soft-strap descriptor means.

In Example 38, the subject matter of any one or more of Examples 34-37 optionally include, further comprising: model-specific register programming means for indicating the SMM functionality is to be disabled from execution, wherein the model-specific register programming means causes the value to indicate the SMM disabled state to be set to indicate the SMM disabled state.

In Example 39, the subject matter of any one or more of Examples 34-38 optionally include, further comprising: boot guard manifest programming means for indicating the SMM functionality is to be disabled from execution, wherein the boot guard manifest programming means causes the value to indicate the SMM disabled state to be set to indicate the SMM disabled state.

In Example 40, the subject matter of any one or more of Examples 34-39 optionally include, further comprising: means for storing a value to indicate an SMM enabled state, in response to a determination that the SMM functionality is to be enabled for execution by the processor circuitry, wherein the value that indicates the SMM enabled state is established as read-only.

In Example 41, the subject matter of any one or more of Examples 34-40 optionally include, further comprising: means for providing a value that indicates the SMM disabled state in a hash of one or more register values, the one or more register values indicating a state of configuration for the computing system.

In Example 42, the subject matter of any one or more of Examples 34-41 optionally include, further comprising: means for hashing the value in the model-specific register to produce a hashed register value; and means for storing the hashed register value.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. At least one non-transitory machine readable storage medium, comprising a plurality of instructions that, responsive to being executed with processor circuitry of a computing device, cause the computing device to:
    evaluate an indicator to determine whether system management mode (SMM) functionality is to be disabled from use by the processor circuitry, wherein the SMM functionality is a privileged operating mode available in the processor circuitry that is triggered by an interrupt; and
    store a value in a model-specific register to indicate an SMM disabled state, in response to the indicator specifying that the SMM functionality is to be disabled from use by the processor circuitry, wherein the value that indicates the SMM disabled state is established as read-only in the model-specific register.

2. The at least one non-transitory machine readable storage medium of claim 1, the plurality of instructions further comprising additional instructions that:
    prevent execution of the SMM functionality from a system management interrupt (SMI) of the processor circuitry, in response to the value in the model-specific register indicating the SMM disabled state.

3. The at least one non-transitory machine readable storage medium of claim 1, wherein the indicator is a physical hardware strap located in the processor circuitry, and wherein operations that evaluate the indicator to determine whether the SMM functionality is to be disabled include detection of the physical hardware strap.

4. The at least one non-transitory machine readable storage medium of claim 1, wherein the indicator is a soft-strap descriptor accessed by a chipset of the processor circuitry, the soft-strap descriptor loaded from a descriptor stored on a serial peripheral interface (SPI) flash memory, and wherein operations that perform the evaluation to determine whether the SMM functionality is to be disabled include detection of the soft-strap descriptor.

5. The at least one non-transitory machine readable storage medium of claim 1, wherein the indicator is a model-specific register programming included in firmware executed by the processor circuitry, wherein the model-specific register programming included in the firmware causes the value in the model-specific register to be set to indicate the SMM disabled state.

6. The at least one non-transitory machine readable storage medium of claim 1, wherein the indicator is a boot guard manifest programming included in firmware executed by the processor circuitry, wherein the boot guard manifest programming included in the firmware causes the value in the model-specific register to be set to indicate the SMM disabled state.

7. The at least one non-transitory machine readable storage medium of claim 1, wherein the value in the model-specific register is configured to indicate the SMM functionality is disabled or the SMM functionality is executable.

8. The at least one non-transitory machine readable storage medium of claim 7, the plurality of instructions further comprising additional instructions that:
    store the value in the model-specific register to indicate the SMM functionality is executable, in response to a determination that the SMM functionality is not disabled from use by the processor circuitry, wherein the value that indicates the SMM functionality is executable is established as read-only in the model-specific register.

9. The at least one non-transitory machine readable storage medium of claim 1, wherein the value in the model-specific register is provided for use in the processor circuitry in a hash of one or more register values, the one or more register values indicating a state of configuration for the computing device.

10. The at least one non-transitory machine readable storage medium of claim 1, the plurality of instructions further comprising additional instructions that:
    hash the value in the model-specific register to produce a hashed register value; and
    store the hashed register value.

11. A computing system, comprising:
    a central processing unit (CPU), comprising an instruction execution unit and a plurality of control registers, the plurality of control registers including a model-specific register to indicate an system management mode (SMM) state; and
    a storage medium comprising a plurality of instructions that, responsive to being executed with the instruction execution unit of the CPU, cause the computing system to:
    evaluate an indicator to determine whether system management mode (SMM) functionality is to be disabled from use by the CPU, wherein the SMM functionality is a privileged operating mode available in the CPU that is triggered by an interrupt; and
    store a value in the model-specific register to indicate an SMM disabled state, in response to the indicator specifying that the SMM functionality is to be disabled from use by the CPU, wherein the value in the model-specific register that indicates the SMM disabled state is established as read-only in the model-specific register.

12. The computing system of claim 11, the plurality of instructions further comprising additional instructions that:
prevent execution of the SMM functionality from a system management interrupt (SMI) of the CPU, in response to the value in the model-specific register indicating the SMM disabled state.

13. The computing system of claim 11, wherein the indicator is a physical hardware strap located in the CPU, and wherein operations that evaluate the indicator to determine whether the SMM functionality is to be disabled include detection of the physical hardware strap.

14. The computing system of claim 11, further comprising a chipset that is operably coupled to the CPU, and a serial peripheral interface (SPI) flash memory that is operably coupled to the chipset, wherein the indicator is a soft-strap descriptor accessed by the chipset, the soft-strap descriptor loaded from a descriptor stored on the SPI flash memory, and wherein operations that perform the evaluation to determine whether the SMM functionality is to be disabled include detection of the soft-strap descriptor.

15. The computing system of claim 11, wherein the indicator is a model-specific register programming included in firmware executed by the CPU, wherein the model-specific register programming included in the firmware causes the value in the model-specific register to be set to indicate the SMM disabled state.

16. The computing system of claim 11, wherein the indicator is a boot guard manifest programming included in firmware executed by the CPU, wherein the boot guard manifest programming included in the firmware causes the value in the model-specific register to be set to indicate the SMM disabled state.

17. The computing system of claim 11, wherein the value in the model-specific register is configured to indicate the SMM functionality is disabled or the SMM functionality is executable.

18. The computing system of claim 17, the plurality of instructions further comprising additional instructions that:
store the value in the model-specific register to indicate the SMM functionality is executable, in response to a determination that the SMM functionality is not disabled from use by the CPU, wherein the value that indicates the SMM functionality is executable is established as read-only in the model-specific register.

19. The computing system of claim 11, wherein the value in the model-specific register is provided for use in the CPU in a hash of one or more register values, the one or more register values indicating a state of configuration for the computing system.

20. The computing system of claim 11, the plurality of instructions further comprising additional instructions that:
hash the value in the model-specific register to produce a hashed register value; and
store the hashed register value.

21. A method, which when performed by processor circuitry of a computing system, causes the computing system to perform electronic operations including:
evaluating an indicator to determine whether system management mode (SMM) functionality is to be disabled from use by the processor circuitry, wherein the SMM functionality is a privileged operating mode available in the processor circuitry that is triggered by an interrupt; and
storing a value in a model-specific register to indicate an SMM disabled state, in response to the indicator specifying that the SMM functionality is to be disabled from use by the processor circuitry, wherein the value that indicates the SMM disabled state is established as read-only in the model-specific register.

22. The method of claim 21, the electronic operations further including:
preventing execution of the SMM functionality from a system management interrupt (SMI) of the processor circuitry, in response to the value in the model-specific register indicating the SMM disabled state.

23. The method of claim 21, wherein the indicator is one of:
a physical hardware strap located in the processor circuitry, wherein operations that evaluate the indicator to determine whether the SMM functionality is to be disabled include detection of the physical hardware strap;
a soft-strap descriptor accessed by a chipset of the processor circuitry, the soft-strap descriptor loaded from a descriptor stored on a serial peripheral interface (SPI) flash memory, and wherein operations that evaluate the indicator to determine whether the SMM functionality is to be disabled include detection of the soft-strap descriptor;
model-specific register programming included in firmware executed by the processor circuitry, wherein the model-specific register programming included in the firmware causes the value in the model-specific register to be set to indicate the SMM disabled state; or
boot guard manifest programming included in firmware executed by the processor circuitry, wherein the boot guard manifest programming included in the firmware causes the value in the model-specific register to be set to indicate the SMM disabled state.

24. The method of claim 21, wherein the value in the model-specific register is configured to indicate the SMM functionality is disabled or the SMM functionality is executable.

25. The method of claim 24, further comprising:
storing the value in the model-specific register to indicate the SMM functionality is executable, in response to a determination that the SMM functionality is not disabled from use by the processor circuitry, wherein the value that indicates the SMM functionality is executable is established as read-only in the model-specific register.

26. The method of claim 21, wherein the value in the model-specific register is provided for use in the processor circuitry in a hash of one or more register values, the one or more register values indicating a state of configuration for the computing system.

* * * * *